(12) United States Patent
Miyanohara et al.

(10) Patent No.: US 11,094,932 B2
(45) Date of Patent: Aug. 17, 2021

(54) HYDROGEN STORAGE ALLOY

(71) Applicant: MITSUI MINING & SMELTING CO., LTD., Tokyo (JP)

(72) Inventors: Keisuke Miyanohara, Takehara (JP); Kyohei Yamaguchi, Takehara (JP)

(73) Assignee: Mitsui Mining & Smelting Co., Ltd.

( * ) Notice: Subject to any disclaimer, the term of this patent is extended or adjusted under 35 U.S.C. 154(b) by 74 days.

(21) Appl. No.: 16/464,196

(22) PCT Filed: Dec. 20, 2017

(86) PCT No.: PCT/JP2017/045655
§ 371 (c)(1),
(2) Date: May 24, 2019

(87) PCT Pub. No.: WO2018/123752
PCT Pub. Date: Jul. 5, 2018

(65) Prior Publication Data
US 2019/0348671 A1 Nov. 14, 2019

(30) Foreign Application Priority Data
Dec. 26, 2016 (JP) .............................. JP2016-250887

(51) Int. Cl.
*H01M 4/38* (2006.01)
*C22C 19/03* (2006.01)

(52) U.S. Cl.
CPC .............. *H01M 4/383* (2013.01); *C22C 19/03* (2013.01); *C22C 2202/04* (2013.01)

(58) Field of Classification Search
CPC ...... H01M 4/383; H01M 4/385; H01M 4/242; H01M 10/345; H01M 10/347; H01M 2004/027; C22C 19/03; C22C 19/007; C22C 19/005; C22C 2202/04; C22C 28/00; C22C 22/00
See application file for complete search history.

(56) References Cited

U.S. PATENT DOCUMENTS

| | | | |
|---|---|---|---|
| 5,496,424 A | 3/1996 | Fujitani et al. | |
| 5,900,334 A | 5/1999 | Wada et al. | |
| 6,207,323 B1 | 3/2001 | Yamaguchi et al. | |
| 6,773,667 B2 | 8/2004 | Yasuda et al. | |
| 7,935,305 B2 | 5/2011 | Takamaru et al. | |
| 8,535,460 B2 | 9/2013 | Mukai et al. | |
| 9,219,277 B2 | 12/2015 | Mukai et al. | |
| 2002/0192153 A1 | 12/2002 | Yasuda et al. | |
| 2004/0159377 A1 | 8/2004 | Takamaru et al. | |
| 2006/0188385 A1 | 8/2006 | Mukai et al. | |
| 2008/0014502 A1 | 1/2008 | Takamaru et al. | |
| 2010/0301283 A1 | 12/2010 | Takamaru et al. | |
| 2013/0157132 A1 | 6/2013 | Mukai et al. | |
| 2016/0298214 A1* | 10/2016 | Kikugawa | C22C 1/02 |

FOREIGN PATENT DOCUMENTS

| | | |
|---|---|---|
| CN | 1174894 A | 3/1998 |
| CN | 105745342 A | 7/2016 |
| EP | 0591952 A1 | 4/1994 |
| JP | H08-120364 A | 5/1996 |
| JP | H10-152740 A | 6/1998 |
| JP | H11-260361 A | 9/1999 |
| JP | 2000-345253 A | 12/2000 |
| JP | 2001-040442 A | 2/2001 |
| JP | 2001-181763 A | 7/2001 |
| JP | 2001-348636 A | 12/2001 |
| JP | 2002-146458 A | 5/2002 |
| JP | 2002-294373 A | 10/2002 |
| JP | 2004-043841 A | 2/2004 |
| JP | 2011-108618 A | 6/2011 |
| WO | WO-2005/014871 A1 | 2/2005 |
| WO | WO-2007-040277 A1 | 4/2007 |
| WO | WO2015147044 * | 10/2015 |

OTHER PUBLICATIONS

Osumi, Yasuaki: "New Edition Hydrogen storage alloys—properties and applications"; AGNE Gijutsu Center Inc.; Jul. 31, 2008; pp. 125, 138-140; (14 pages).
Wei, Xuedong et al.: "Microstructures and electrochemical properties of Co-free $AB_{5-type}$ hydrogen storage alloys through substitution of Ni by Fe"; Electrochimica Acta; vol. 52 (2007); pp. 2423-2428.
Qin, Haiying et al.: "Direct biofuel low-temperature solid oxide fuel cells"; Supplementary Material (ESI) for Energy & Environmental Science; (c) The Royal Society of Chemistry; 2011; (3 pages).
Hsu, Cheng-Hsun et al.: "Erosion and Corrosion Behaviors of ADI Deposited TiN/TiAlN Coatings by Cathodic Arc Evaporation"; Materials Transactions; vol. 46; No. 6; (2005); pp. 1417-1424.

* cited by examiner

*Primary Examiner* — Ula C Ruddock
*Assistant Examiner* — Matthew W Van Oudenaren
(74) *Attorney, Agent, or Firm* — Harness, Dickey & Pierce, P.L.C.

(57) ABSTRACT

A hydrogen storage alloy suitable for prescribed pretreatment, that is, pretreatment wherein mechanical pulverization is performed after pulverizing a hydrogen storage alloy and absorbing/desorbing hydrogen is provided. The hydrogen storage alloy comprises a parent phase having a $CaCu_5$-type, that is, an $AB_5$-type crystal structure, wherein the A site is constituted from a rare earth element containing La; and the B site does not contain Co and contains at least Ni, Al, and Mn, with the ratio (Mn/Al) of the content of Mn (molar ratio) to the content of Al (molar ratio) being 0.60 or more and less than 1.56, and the ratio (La/(Mn+Al)) of the content of La (molar ratio) to the total content of the content of Al (molar ratio) and the content of Mn (molar ratio) being more than 0.92.

10 Claims, No Drawings

HYDROGEN STORAGE ALLOY

CROSS-REFERENCE TO RELATED APPLICATIONS

This application is a U.S. National Phase Application under 35 U.S.C. 371 of International Application No. PCT/JP2017/045655, filed on Dec. 20, 2017 and published in Japanese as WO 2018/123752 A1 on Jul. 5, 2018 which is based on and claims the benefit of priority from Japanese Patent Application No. 2016-250887 filed Dec. 26, 2016. The entire disclosures of all of the above applications are incorporated herein by reference.

BACKGROUND

Technical Field

The present invention relates to an $AB_5$-type hydrogen storage alloy having a $CaCu_5$-type crystal structure. Specifically, the present invention relates to a hydrogen storage alloy suitable as a negative electrode active material used for a nickel-hydrogen battery mounted on an electric vehicle, a hybrid electric vehicle, and the like.

Related Art

A hydrogen storage alloy (also referred to as "MH") is an alloy that reacts with hydrogen to form a metal hydride, and since the alloy can reversibly absorb and desorb (also referred to as "release") a large amount of hydrogen at around room temperature, practical utilization thereof as a battery material has been advanced in various fields, such as: a nickel-hydrogen battery (also referred to as "Ni-MH battery") mounted on an electric vehicle (EV), a hybrid electric vehicle (HEV: a motor vehicle using two power sources of an electric motor and an internal combustion engine in combination), and a digital still camera; and a fuel battery.

Various alloys, such as an $AB_5$-type alloy typified by $LaNi_5$, an $AB_2$-type alloy typified by $ZrV_{0.4}Ni_{1.5}$, an AB-type alloy, and an $A_2B$-type alloy, are known as hydrogen storage alloys. Many of these alloys are composed of a combination of an element group that has high affinity with hydrogen and plays a role of increasing hydrogen storage capacity (such as Ca, Mg, rare earth elements, Ti, Zr, V, Nb, Pt, and Pd) and an element group that has a relatively low affinity with hydrogen and a small hydrogen storage capacity but plays a role of promoting hydrogenation reaction and reducing the reaction temperature (such as Ni, Mn, Cr, and Fe).

Among them, an $AB_5$-type hydrogen storage alloy having a $CaCu_5$-type crystal structure, for example, an alloy using Mm (misch metal) which is a rare earth-based mixture in the A site and elements such as Ni, Al, Mn, and Co in the B site (hereinafter, this type of alloy is referred to as "Mm—Ni—Mn—Al—Co alloy") has features that a negative electrode can be composed of relatively inexpensive materials compared with other alloy compositions, and that a closed-type nickel-hydrogen battery with long cycle life and little internal pressure increase due to gases generated during overcharging can be composed.

In the constituent elements of the Mm—Ni—Mn—Al—Co alloy, Co is an important element to suppress pulverization of alloys and to exert the effect of improving charge-discharge cycle ability, and thus Co is hitherto generally blended in about 10% by mass (0.6 to 1.0 in molar ratio). However, Co is very expensive metal, and thus it is preferable to reduce Co amount when considering the expanded use of the hydrogen storage alloy in the future. On the other hand, since reducing Co amount leads to deterioration in the charge-discharge cycle ability, reducing Co amount while achieving both the output characteristics and the charge-discharge cycle ability has been a research problem. Particularly, in order to promote development of the utilization for power sources for an electric vehicle (EV), a hybrid electric vehicle (HEV: a motor vehicle using two power sources of an electric motor and an internal combustion engine in combination), and the like, there has been an essential problem that the output characteristics and the charge-discharge cycle ability are maintained at a high level.

In view of these problems, various proposals to reduce Co amount and still maintain the battery characteristics have been disclosed.

For example, Japanese Patent Laid-Open No. 2002-294373 discloses a hydrogen storage alloy having a composition represented by a compositional formula: RNix-CoyMz (R: rare earth element, M: Mg, Al, Mn, and the like, $3.7 \leq x \leq 5.3$, $0.1 \leq y \leq 0.5$, $0.1 \leq z \leq 1.0$, and $5.1 \leq x+y+z \leq 5.5$), and a substantially single phase structure, wherein the crystals thereof have an average long axis diameter of 30 to 160 μm, or 5 μm to less than 30 μm.

Japanese Patent Laid-Open No. 2001-0181763 discloses a hydrogen storage alloy having a $CaCu_5$-type crystal structure represented by a general formula: MmNia Mnb Coc Cud (wherein Mm represents a misch metal, $3.7 \leq a \leq 4.2$, $0.3 < b \leq 0.6$, $0.2 \leq c \leq 0.4$, $0 < d \leq 0.4$, and $5.00 \leq a+b+c+d \leq 5.35$).

Japanese Patent Laid-Open No. 2001-040442 discloses a hydrogen storage alloy having a $CaCu_5$-type crystal structure represented by a general formula: MmNiaMnbAlc-CodXe (wherein Mm represents a misch metal, X represents Fe and/or Cu, $3.7 \leq a \leq 4.2$, $0 \leq b \leq 0.3$, $0 \leq c \leq 0.4$, $0.2 \leq d \leq 0.4$, $0 \leq e$ 0.4, and $5.00 \leq a+b+c+d+e \leq 5.20$; however, excluding the case of b=c=0; b+c<0.5 when $0 < b \leq 0.3$ and $0 < c \leq 0.4$ are satisfied).

Japanese Patent Laid-Open No. 2001-348636 discloses a hydrogen storage alloy that is an $AB_5$-type hydrogen storage alloy having a $CaCu_5$-type crystal structure represented by a general formula: MmNiaMnbAlcCod (wherein Mm represents a misch metal, $4.1 < a \leq 4.3$, $0.4 < b \leq 0.6$, $0.2 \leq c \leq 0.4$, $0.1 \leq d \leq 0.4$, and $5.2 \leq a+b+c+d \leq 5.45$) or a general formula: MmNiaMnbAlcCodXe (wherein Mm represents a misch metal, X represents Cu and/or Fe, $4.1 < a \leq 4.3$, $0.4 < b \leq 0.6$, $0.2 \leq c \leq 0.4$, $0.1 \leq d \leq 0.4$, $0 < e \leq 0.1$, and $5.2 \leq a+b+c+d+e \leq 5.45$), wherein the lattice length of the c-axis is 406.2 μm or more.

International Publication No. WO 2005/014871 discloses a low Co hydrogen storage alloy having a $CaCu_5$-type crystal structure that can be represented by a general formula: MmNiaMnbAlcCod (wherein Mm represents a misch metal, $4.0 \leq a \leq 4.7$, $0.3 \leq b \leq 0.65$, $0.2 \leq c \leq 0.5$, $0 < d \leq 0.35$, and $5.2 \leq a+b+c+d \leq 5.5$), wherein the a-axis length of the crystal lattice in the $CaCu_5$-type crystal structure is 499 μm or more, and the c-axis length thereof is 405 μm or more as a hydrogen storage alloy having an extremely low Co content and capable of maintaining the high levels of output characteristics (particularly pulse discharge characteristics), activity (degree of activity), and charge-discharge cycle ability.

International Publication No. WO 2007/040277 discloses a hydrogen storage alloy having a $CaCu_5$-type crystal structure that can be represented by a general formula: MmNiaMnbAlcCodFee (wherein Mm represents a misch metal containing La, $0.2 \leq d \leq 0.5$, $5.025 \leq a+b+c+d+e \leq 5.200$), wherein the content of La in the hydrogen storage alloy is 13 to 27 wt %; and the CaCu$_5$-type crystal structure has a lattice volume of 88.70×10$^6$ (pm$^3$) or less and a full width at half maximum at the (002) plane of 0.29 (°) or less, which are obtained by subjecting the alloy to X-ray diffraction measurement and refinement of a lattice constant.

In recent years, MH batteries to be mounted on an electric vehicle (EV) and a hybrid electric vehicle (HEV) are being particularly demanded to further enhance the output characteristics.

As a method for enhancing the output characteristics of a battery using a hydrogen storage alloy (also referred to as "MH battery"), for example, a method of improving the hydrogen storage alloy so as to easily enlarge the specific surface area by cracking the hydrogen storage alloy while repeating charging and discharging of the battery; and a method of activating the surface of the hydrogen storage alloy by immersing the hydrogen storage alloy powder into an alkali aqueous solution or an acid, are proposed. For example, a method in which a hydrogen storage alloy powder is subjected to surface treatment using a weakly acidic aqueous solution having a pH value of 0.5 to 5, is disclosed (for example, Japanese Patent Laid-Open No. H11-260361).

As an evaluation method of a hydrogen storage alloy capable of further enhancing output characteristics of a MH battery, the present inventors find that performing treatment in which mechanical pulverization is performed after pulverizing a hydrogen storage alloy and absorbing/desorbing hydrogen to crack the alloy by expansion and contraction (referred to as "two-step pulverization treatment") before using the alloy as a negative electrode active material of a battery, is effective.

Thus, the present invention relates to an AB$_5$-type hydrogen storage alloy, and is to propose a novel hydrogen storage alloy suitable for two-step pulverization treatment in which mechanical pulverization is performed after pulverizing a hydrogen storage alloy to be particles having a particle size of 1,000 to 300 μm and absorbing/desorbing hydrogen, that is, a hydrogen storage alloy capable of being more atomized than hitherto.

SUMMARY

The present invention proposes a hydrogen storage alloy comprising a parent phase having a CaCu$_5$-type, that is, an AB$_5$-type crystal structure, in which the A site is constituted from a rare earth element containing La; and the B site does not contain Co and contains at least Ni, Al, and Mn, with the ratio (Mn/Al) of the content of Mn (molar ratio) to the content of Al (molar ratio) being 0.60 or more and less than 1.56, and the ratio (La/(Mn+Al)) of the content of La (molar ratio) to the total content of the content of Al (molar ratio) and the content of Mn (molar ratio) being more than 0.92.

Advantageous Effect of the Invention

When the hydrogen storage alloy proposed by the present invention is used as a negative electrode active material of a battery, the alloy can be more atomized than hitherto, so that the output of the battery can be enhanced. In addition, when the two-step pulverization treatment in which mechanical pulverization is performed after pulverizing a hydrogen storage alloy and absorbing/desorbing hydrogen is performed before using the alloy as a negative electrode active material of a battery, the alloy can be more effectively atomized. In the case of using the alloy as a negative electrode active material, the output of the battery can be more effectively enhanced from an initial stage of usage.

DETAILED DESCRIPTION OF THE EMBODIMENTS

Next, the present invention will be described based on exemplary embodiments. However, the present invention is not limited to the embodiments described below.

Present Hydrogen Storage Alloy

The hydrogen storage alloy of the present embodiment (hereinafter referred to as "present hydrogen storage alloy") is a hydrogen storage alloy comprising a parent phase having a CaCu$_5$-type crystal structure having a space group of International Table Number 191 (P6/mmm), that is, an AB$_5$-type crystal structure.

Composition

The present hydrogen storage alloy is characterized in that an A site in an ABx composition is constituted from a rare earth element containing La, and a B site in the ABx composition does not contain Co and contains at least Ni, Al, and Mn.

As an example of the present hydrogen storage alloy, an AB$_5$-type hydrogen storage alloy that can be represented by a general formula: MmNiaMnbAlc (wherein Mm represents a rare earth element containing La, and $3.8 \leq a \leq 4.7$, $0.1 \leq b \leq 0.6$, and $0.1 \leq c \leq 0.6$) or a general formula: MmNiaMnbAlcMd (wherein Mm represents a rare earth element containing La, M represents one or two or more transition metals excluding Ni, Mn, Al, and Co, and $3.8 \leq a \leq 4.7$, $0.1 \leq b \leq 0.6$, $0.1 \leq c \leq 0.6$, and $0 < d \leq 0.2$) can be cited. However, the present invention is not limited these compositions.

In the present hydrogen storage alloy, the ratio (referred to as "ABx") of the total number of moles of elements (that is, "a+b+c" or "a+b+c+d" in the above formulae) constituting the B site in the ABx composition to the total number of moles of elements constituting the A site in the ABx composition is not particularly limited.

For example, from the viewpoint of using the alloy for a negative electrode active material of a Ni-MH battery to be mounted on an electric vehicle (referred to as "EV") and a hybrid electric vehicle (referred to as "HEV"), the ratio preferably satisfies $5.00 \leq ABx \leq 5.40$. When ABx is 5.00 or more, reduction in charge-discharge cycle ability (capacity retention ratio) can be suppressed. Thus, from such a viewpoint, ABx is more preferably 5.10 or more, even more preferably 5.20 or more, still more preferably 5.30 or more. However, the capacity is decreased when ABx is too large, and thus ABx is more preferably 5.35 or less from the viewpoint of the capacity.

Further, from the viewpoint of output characteristics, ABx is preferably 4.85 or more, more preferably 4.90 or more, even more preferably 4.95 or more.

In the present hydrogen storage alloy, the above Mm may be a rare earth element containing La, and examples thereof may include a rare earth-based mixture (misch metal) containing La. In so doing, the La amount in the mixture (misch metal) is preferably 60 to 100% by mass, more preferably 70% by mass or more or 90% by mass or less, even more preferably 75% by mass or more or 85% by mass or less.

Further, the La amount in the mixture (misch metal) is preferably 70% by mass or more, more preferably 85% by mass or more, even more preferably 90% by mass or more.

At least one of Ce, Pr, and Nd, or a combination of two or more of these may be contained in the rare earth-based mixture (misch metal) in addition to La, and other elements may also be further contained.

Examples of the above Mm may include one comprising La only, one comprising La and Ce, and one containing rare earth elements such as Pr, Nd, and Sm in addition to La and Ce. In so doing, the examples thereof may include a rare earth mixture comprising Ce (3 to 10 wt %), La (15 to 40 wt %), Pr, and Nd as main constituent elements.

More specifically, the content of La in the hydrogen storage alloy is preferably 15 to 35 wt %, more preferably 18 wt % or more or 34 wt % or less, even more preferably 20 wt % or more or 33 wt % or less; and the content of Ce in the hydrogen storage alloy is preferably 0 to 10 wt %, more preferably 9 wt % or less, even more preferably 8.5 wt % or less.

In the present hydrogen storage alloy, the ratio (Mn/Al) of the content of Mn (molar ratio) to the content of Al (molar ratio) is preferably less than 1.56.

When the ratio (Mn/Al) in the present hydrogen storage alloy is less than 1.56, equilibrium pressure (Plateau pressure) of the hydrogen storage is lowered, which is preferable. However, when the ratio (Mn/Al) is too small, there is a possibility to cause a problem, for example, characteristics of the positive electrode are decreased by eluting Al.

From such a viewpoint, in the present hydrogen storage alloy, the ratio (Mn/Al) of the content of Mn (molar ratio) to the content of Al (molar ratio) is preferably 0.60 or more and less than 1.56, more preferably 1.15 or more, even more preferably 1.17 or more or 1.40 or less, still more preferably 1.36 or less.

In the present hydrogen storage alloy, the ratio (La/(Mn+Al)) of the content of La (molar ratio) to the total content of the content of Al (molar ratio) and the content of Mn (molar ratio) is preferably more than 0.92.

The ratio (La/(Mn+Al)) is preferably more than 0.92 in the present hydrogen storage alloy, since the hydrogen storage rate becomes high and the alloy can be easily atomized.

From such a viewpoint, the ratio (La/(Mn+Al)) of the content of La (molar ratio) to the total content of the content of Al (molar ratio) and the content of Mn (molar ratio) is preferably more than 0.92, more preferably more than 1.05, even more preferably more than 1.19.

With respect to Ni, from the viewpoint of maintaining pulverization characteristics and charge-discharge cycle ability while maintaining output characteristics, the ratio of the number of moles of Ni to the total number of moles of Mm constituting the A site, that is, the molar ratio (a) of Ni in the above general formulae, is preferably 3.8 or more and 4.7 or less, more preferably 4.0 or more or 4.6 or less.

With respect to Mn, from the viewpoint of capable of suppressing the deterioration of the energy efficiency of charge and discharge due to excessively high Plateau pressure and capable of suppressing the reduction in hydrogen storage capacity, the molar ratio (b) of Mn in the above general formulae is preferably 0.1 or more and 0.6 or less, more preferably 0.2 or more or 0.5 or less, even more preferably 0.3 or more or 0.45 or less.

With respect to Al, from the viewpoint of easily maintaining the pulverization residual ratio, the molar ratio (c) of Al in the above general formulae is preferably 0.1 or more and 0.6 or less, more preferably 0.15 or more or 0.45 or less, even more preferably 0.2 or more or 0.4 or less.

The M element in the general formula: $MmNi_aMn_bAl_cM_d$ (wherein Mm represents a misch metal) may be, for example, one or two or more transition metals excluding Ni, Mn, Al, and Co. Examples thereof may include Fe, Cu, V, Zn, Zr, and the like. Among others, from the viewpoint of charge-discharge cycle ability, preferred examples may include one or two of Fe and Cu, and more preferred examples may include Fe. For example, by adding adequate amount of Fe, pulverization can be suppressed, that is, charge-discharge cycle ability can be increased. However, the M element in the above composition formula is not an essential element.

The molar ratio (d) of the M element in the above general formulae preferably satisfies $0 \leq d \leq 0.20$. Among others, the molar ratio (d) is more preferably adjusted within 0.10 or less, even more preferably 0.05 or less.

In addition to the above elements, the present hydrogen storage alloy may contain elements such as Ti, Mo, W, Si, Ca, Pd, Cd, Mg, and Co as unavoidable impurities. However, the total content of the elements is preferably an amount not affecting the performance, that is, less than about 0.05% by mass.

(Two-Step Pulverization-Treated Average Particle Diameter)

The present hydrogen storage alloy has a characteristic that the particle size at the time of performing mechanical pulverization after pulverizing a hydrogen storage alloy and absorbing/desorbing hydrogen can be reduced. In other words, the average particle diameter obtained by crushing a hydrogen storage alloy using a crusher, absorbing/desorbing hydrogen under the condition where the hydrogen pressure is reduced and raised in a range of 0 to 30 MPa at room temperature, and then performing mechanical pulverization using a fine-pulverizer (referred to as "two-step pulverization-treated average particle diameter" in the present invention) can be made to 20 μm or less.

Thus, the present hydrogen storage alloy is subjected to the two-step pulverization treatment, in which mechanical pulverization is performed after pulverizing a hydrogen storage alloy and absorbing/desorbing hydrogen, before being used as a negative electrode active material of batteries, so that the output of MH batteries can be effectively enhanced.

From such a viewpoint, the two-step pulverization-treated average particle diameter of the present hydrogen storage alloy is preferably 1.0 to 7.0 μm, more preferably 2.0 μm or more or 6.5 μm or less, even more preferably 4.0 μm or more or 6.0 μm or less.

In order to adjust the two-step pulverization-treated average particle diameter of the present hydrogen storage alloy to the above range, it is preferred to adjust heat treatment conditions after adjusting the composition as described above. For example, with respect to the temperature control of heat treatment, it is preferred that the alloy is subjected to heat treatment for maintaining a predetermined temperature, cooled, and then subjected to second heat treatment so as to maintain a predetermined temperature. It is also preferred that the alloy is subjected to pulse-controlled temperature control of repeating temperature control cycles at a predetermined interval, in which a predetermined temperature (heat treatment temperature) is maintained; the temperature is once increased from the central temperature and returned to the central temperature in a short time; and then the temperature is once decreased from the central temperature and returned to the central temperature in a short time. However, the temperature control is not limited to such a method.

a-Axis Length

The present hydrogen storage alloy preferably has an a-axis length, which is obtained by powder X-ray diffraction measurement, of 5.02 Å or more and 5.08 Å or less.

The a-axis length of the present hydrogen storage alloy is preferably 5.02 Å or more since the battery life and pulverization characteristics can be maintained. In addition, the a-axis length of the present hydrogen storage alloy is preferably 5.08 Å or less since the hydrogen storage characteristics and output characteristics can also be maintained.

From such a viewpoint, the a-axis length of the present hydrogen storage alloy is preferably 5.02 Å or more and 5.08 Å or less, more preferably 5.03 Å or more or 5.07 Å or less, even more preferably 5.03 Å or more or 5.06 Å or less.

In order to adjust the a-axis length of the present hydrogen storage alloy to the above range, for example, it is preferred to adjust heat treatment conditions or the like. However, it is not limited to this method.

Equilibrium Hydrogen Pressure

In the present hydrogen storage alloy, equilibrium hydrogen pressure at a hydrogen storage capacity (H/M) of 0.5, in a pressure-composition isothermal chart (PCT curve) at 45° C., is preferably 0.005 MPa or more and 0.035 MPa or less.

The equilibrium hydrogen pressure of the present hydrogen storage alloy is preferably 0.005 MPa or more since the charge-discharge cycle ability can be maintained at a high level. In addition, the equilibrium hydrogen pressure of the present hydrogen storage alloy is preferably 0.035 MPa or less since the output characteristics can be maintained at a high level.

From such a viewpoint, the equilibrium hydrogen pressure of the present hydrogen storage alloy is preferably 0.005 MPa or more and 0.035 MPa or less, more preferably 0.007 MPa or more or 0.033 MPa or less, even more preferably 0.009 MPa or more or 0.032 MPa or less.

In order to adjust the equilibrium hydrogen pressure of the present hydrogen storage alloy to the above range, for example, the composition, especially ABx or the like may be adjusted. However, it is not limited to this method.

Method for Producing Present Hydrogen Storage Alloy

The present hydrogen storage alloy can be obtained, for example, by weighing and mixing each hydrogen storage alloy raw material so as to obtain a predetermined alloy composition, melting the hydrogen storage alloy raw materials, for example, using a high-frequency heating melting furnace by induction heating to form a molten metal, pouring the molten metal into a mold, for example, a water-cooled-type mold, casting the molten metal at a cast molten metal temperature of, for example, 1,350 to 1,550° C., subjecting the cast metal to a predetermined heat treatment, and then pulverizing the heat-treated cast metal.

However, the method for producing the present hydrogen storage alloy is not limited to such a production method.

The atmosphere during the heat treatment is preferably inert gas, such as Ar and $N_2$.

The temperature during the heat treatment is preferably controlled as follows: a temperature of 900 to 1,100° C. (referred to as "heat treatment temperature") is maintained for 1 to 10 hours to perform heat treatment; next, the alloy is cooled to 500° C. at a cooling rate of 10 to 30° C./min and then naturally cooled to 100° C. or less; and then, the heat treatment and cooling under the same conditions as described above are performed twice or three times or more.

In the above heat treatment, one heat-treatment time is preferably 1 hour or more and 10 hours or less, more preferably 2 hours or more or 8 hours or less, even more preferably 2 hours or more or 6 hours or less.

Further, the alloy may be subjected to pulse control of repeating temperature control cycles at a predetermined interval as needed, in which the alloy is heated to a temperature of 900 to 1,100° C. (referred to as "heat treatment central temperature"); the temperature is increased from the heat treatment central temperature and returned to the heat treatment central temperature in a short time; and then the temperature is decreased from the heat treatment central temperature and returned to the heat treatment central temperature in a short time.

In such pulse control, it is preferable for the temperature to be raised and decreased by 2 to 10° C., more preferably 2 to 8° C., even more preferably 2 to 5° C., from the heat treatment central temperature.

Further, in the above pulse control, the heating rate and the cooling rate are preferably 0.1 to 1.0° C./min, more preferably 0.1 to 0.8° C./min, even more preferably 0.2° C./min or more or 0.5° C./min or less.

The heat treatment time in the above pulse control, that is, the total heat treatment time, is preferably 1 hour to 10 hours, more preferably 2 hours or more or 8 hours or less, even more preferably 2 hours or more or 6 hours or less.

Then, after the heat treatment by such pulse control, it is preferred that the alloy is cooled to 500° C. at a cooling rate of 10 to 30° C./min and then naturally cooled to 100° C. or less.

The resultant hydrogen storage alloy ingot is preferably pulverized, for example, to a particle size capable of passing through a 500 μm sieve mesh (−500 m). However, the pulverizing may be performed to a particle size capable of passing through a 1,000 μm sieve mesh (−1,000 μm) or a particle size capable of passing through an 850 μm sieve mesh (−850 μm), as needed.

Here, since magnetic separation efficiency is reduced when the ingot is excessively finely pulverized in this stage, the ingot may be pulverized to some extent, but is preferably coarsely crushed such that a coarse powder that is larger than 150 μm is contained in an amount of 50% by mass or more.

The crushing of the hydrogen storage alloy ingot can be performed using a crushing apparatus or a pulverizing apparatus in which a pulverizing portion in contact with a powder, that is, a pulverizing means, is made of iron or an iron alloy. Examples of such a crushing apparatus or a pulverizing apparatus may include a roll crusher, a double roll crusher, a jaw crusher, and the like.

When the crushing is performed in an apparatus provided with a pulverizing means containing iron or an iron alloy, the iron or iron alloy is mixed with the crushed powder, but since at least a magnetic substance that influences a short circuit can be removed in the next magnetic separation step, the crushing is preferably performed in such a pulverizing apparatus. However, it is not limited to these pulverizing apparatuses.

The crushing of the hydrogen storage alloy ingot may be performed by a dry process or may be performed by a wet process.

Utilization of Present Hydrogen Storage Alloy

The present hydrogen storage alloy (including ingot and powder) is preferably subjected to the two-step pulverization treatment, in which mechanical pulverization is performed after pulverizing the present hydrogen storage alloy and absorbing/desorbing hydrogen to crack the alloy by expansion and contraction, as needed. However, the present hydrogen storage alloy may not be essentially subjected to the two-step pulverization treatment.

In the two-step pulverization treatment, the alloy before absorbing/desorbing hydrogen is preferably pulverized to a particle size capable of passing through a 500 μm sieve mesh (−500 μm). As the pulverizing apparatus at this time, a roll crusher, a double roll crusher, a jaw crusher, a disk mill, or the like may be used.

As for the method and the number of absorbing/desorbing hydrogen, absorbing/desorbing of hydrogen gas, heating, and cooling may be respectively performed once or more times by using a vacuum furnace capable of introducing the hydrogen gas.

Further, as for the mechanical pulverization after absorbing/desorbing hydrogen, the alloy may be pulverized to the extent that D50 becomes 1 to 7 μm. As the pulverizing apparatus at this time, a pin mill, a hammer mill, a cyclo mill, or the like may be used.

In addition, the present hydrogen storage alloy is preferably subjected to magnetic separation treatment as needed.

In other words, if a large number of impurities are contained in the present hydrogen storage alloy, the impurities may not only reduce hydrogen storage capacity but also may be eluted into an electrolyte solution (alkaline solution) and pass through a separator, leading to a short circuit (voltage drop) when charge and discharge are repeated under severe conditions such as over discharge. The yield can be maintained at a good level even when the alloy is subjected to magnetic separation treatment.

When the present hydrogen storage alloy (including ingot and powder) is utilized as a negative electrode material for batteries, the negative electrode for batteries can be prepared, for example, by a known method after the alloy is subjected to two-step pulverization treatment or magnetic separation treatment as needed as described above. In other words, a hydrogen storage alloy negative electrode can be formed by mixing a binder, a conductive auxiliary agent, and the like with the present hydrogen storage alloy and molding the mixture by a known method.

In addition, the present hydrogen storage alloy can also be utilized as a negative electrode material for batteries without performing the magnetic separation treatment and the two-step pulverization treatment.

Battery

The hydrogen storage alloy negative electrode thus obtained, that is, the hydrogen storage alloy negative electrode obtained by mixing a binder, a conductive auxiliary agent, and the like with the present hydrogen storage alloy and molding the mixture by a known method can be utilized for primary batteries (including a fuel battery) in addition to secondary batteries. For example, a Ni-MH battery can be formed from the hydrogen storage alloy negative electrode, a positive electrode using nickel hydroxide as an active material, an electrolyte solution made of an alkali aqueous solution, and a separator.

Particularly, the present hydrogen storage alloy is excellent in corrosion resistance and can increase charge-discharge cycle ability without reducing the output, and thus the present hydrogen storage alloy can be particularly suitably used as a Ni-MH battery to be mounted on EV, HEV, and the like requiring these characteristics.

Explanation of Terms

In the case of being expressed as the term "X to Y" (X and Y are arbitrary numbers) in the present description, unless otherwise stated, the term includes the meaning of "preferably more than X" or "preferably less than Y" along with the meaning "not less than X and not more than Y".

Further, in the case of being expressed as the term "X or more" (X is an arbitrary number) or the term "Y or less" (Y is an arbitrary number), the term also includes the intention of being "preferably more than X" or "preferably less than Y".

EXAMPLES

Next, the present invention will be further described based on Examples. However, the present invention is not limited to Examples to be described below.

Example 1

Raw materials were weighed and mixed so as to be Mm: 32.38, Ni: 60.76, Mn: 4.95, and Al: 1.91 in terms of the mass ratio of each element.

Here, a material composed only of La was used as Mm.

The resultant mixture was put into a crucible, and the crucible was fixed in a high frequency melting furnace. The pressure in the furnace was reduced to $10^{-4}$ to $10^{-5}$ Torr, argon gas was then introduced therein, and the mixture was heated to 1,450° C. in an argon gas atmosphere to obtain a molten metal. Next, 10 kg of the molten metal was poured into a water-cooled-type copper mold having a total mass of 200 kg at a rate of 2 kg/sec to obtain a hydrogen storage alloy. Further, the resultant hydrogen storage alloy was put into a stainless steel container, the container was set in a vacuum heat treatment apparatus, and the alloy was heat-treated in an argon gas atmosphere to obtain a hydrogen storage alloy (ingot).

In the heat treatment, the alloy was subjected to high-temperature holding treatment such that the temperature was raised to 913° C. for 1 hour in an argon gas atmosphere, further raised to 1,063° C. for 30 minutes and to 1,073° C. for 10 minutes, and maintained at 1,073° C. for 5 hours. Subsequently, the alloy was cooled to 500° C. at a cooling rate of 20° C./min, and then naturally cooled to 100° C. or less.

Next, the above hydrogen storage alloy (ingot) was crushed to a particle size capable of passing through a 500 μm sieve mesh (−500 μm) using a jaw crusher (model 1021-B) manufactured by Fuji Paudal Co., Ltd. and a brown mill (model 1025-HBG) manufactured by Yoshida Seisakusho Co., Ltd.

It was confirmed that the resultant hydrogen storage alloy (sample) was $LaNi_{4.44}Al_{0.30}Mn_{0.39}$ (ABx=5.13) by ICP analysis.

Examples 2 to 10 and Comparative Examples 1 to 7

A hydrogen storage alloy (sample) was obtained in the same manner as in Example 1 except that the raw material composition in Example 1 was changed to a composition shown in Tables 1 and 2.

Evaluation Method

The hydrogen storage alloy powder (sample) obtained in each of Examples and Comparative Examples was subjected to various evaluations as follows.

Two-Step Pulverization-Treated Average Particle Diameter

The hydrogen storage alloy powder (sample) obtained in each of Examples and Comparative Examples was sieved out with a ϕ300 μm sieve mesh, and the powder, which was remained on the 300 μm sieve mesh, having a particle size of 300-500 μm was used as a sample. The sample having a particle size of 300-500 μm was weighed in an amount of 5.0 g, and charged into a PCT holder. The operations: vacuum-suctioning the PCT holder to 0.01 MPa or less, introducing hydrogen gas to 1.0 MPa and maintaining for 10 seconds, and then vacuum-suctioning to 0.01 MPa or less were performed twice to replace the gas in the holder.

Next, the PCT holder was heated to 300° C. while vacuum-suctioning, and maintained for 30 minutes. Thereafter, the hydrogen storage alloy was subjected to surface cleaning treatment in such a manner that the operations: introducing hydrogen gas to 1.75 MPa while heating at 300° C. and maintaining for 10 minutes, and vacuum-suctioning to 0.01 MPa or less and maintaining for 10 seconds were performed twice. Further, hydrogen gas was introduced to 3.0 MPa while heating at 300° C., and then immediately cooling and maintaining for 10 minutes to store the hydrogen gas into the hydrogen storage alloy powder. After the hydrogen storing, the holder was vacuum-suctioned while heating at 300° C. and maintained for 10 minutes to release hydrogen. Thereafter, the holder was cooled for 15 minutes while vacuum-suctioning, and then the sample was taken out from the holder.

The sample obtained by absorbing/desorbing hydrogen under the above conditions was pulverized for 7 minutes using a cyclo mill ((model 1033-200) manufactured by Yoshida Seisakusho Co., Ltd.) to obtain a hydrogen storage alloy powder (sample). D50 (shown as "Two-Step Pulverization-Treated Average Particle Diameter" in Table 2) of the sample thus obtained was measured.

Here, the sample may be classified with a sieve having an opening of −45 μm to adjust the particle size. However, the present invention is not limited to this method.

As for the measurement of D50, a sample recirculator for laser diffraction particle size distribution analyzer ("Microtrac ASVR," manufactured by Nikkiso Co., Ltd.) was used; the sample (powder) was charged into water; the particle size distribution was measured using a laser diffraction particle size distribution analyzer "HRA (×100)" manufactured by Nikkiso Co., Ltd. in a flow rate of 60 mL/sec; and D50 was determined from a chart of the obtained volume-based particle size distribution.

Here, as a water-soluble solvent in the measurement, water after passing through a 60 μm filter was used; and the value obtained under the conditions where the solvent refractive index was 1.33, the particle transparency condition was reflection; the measurement range was 0.122 to 704.0 μm; and the measuring time was 30 seconds, was used as a measurement value.

Measurement of a-Axis Length

The hydrogen storage alloy powder, which was obtained in each of Examples and Comparative Examples, having a particle size of −500 μm (particles capable of passing through a 500 μm sieve mesh) in an amount of 20 g was pulverized for 1 minute in a cyclo mill ((model 1033-200) manufactured by Yoshida Seisakusho Co., Ltd.) and classified using a sieve having an opening of 20 μm to obtain a hydrogen storage alloy powder (sample) having a particle size of −20 μm (particles capable of passing through a 20 μm sieve mesh).

The resultant sample was filled in a sample holder, and the measurement was performed using an X-ray diffraction apparatus (D8 ADVANCE, manufactured by Bruker AXS).

Here, the specification of the used X-ray diffraction apparatus, the conditions, and the like are as follows.

Apparatus Specification
Tube: CuKα ray
Space-group: P6/mmm
Incident beam pass
[Tube-Mount]
Voltage: 40 [kV]
Current: 40 [mA]
Element: Cu
[Optics_Primary_Mortorized Slit]
Opening: 0.30 [°]
[Slit Mount]
No Slit 10.5 [mm] 10.5 [mm]
Width: 18 [mm]
Height: 10.5 [mm]
Deflection: 0 [°]
[Soller Mount]
Axial Soller 2.5 [°] 2.5 [°]
Axial Divergence: 2.5 [°]
Equatoril Divergence: 0 [°]
Deflection: 0 [°]
light receiving side beam pass
Detector: LYNXEYE XE
[LYNXEYE_XE]
Mode: LYNXEYE_XE (1D mode)
Deflection: 0 [°]
Activation Limit: 200000 [l/s]
Deactivation Limit: 150000 [l/s]
Lower Discriminator: 0.212 [V]
Bining: 1
Counter 1D: 0 [counts]
Scan Counter: 0 [counts]
Counter 0D: 0 [counts]
Upper Discriminator: 0.230 [V]
Orientation: 0 [°]
[Detector Optics Mount 2]
Soller 25 2.5 [°] 2.5 [°]
Axial Divergence: 2.5 [°]
Equatoril Divergence: 0 [°]
Deflection: 0 [°]
[Detector Optics Mount 1]
Slit_Open_1 0 [mm] 0 [mm]
Width: 14 [mm]
Height: 0 [mm]
Deflection: 0 [°]
[Soller Mount]
Deflection: 0 [°]
[Slit Mount]
No Slit 10.5 [mm] 10.5 [mm]
Width: 18 [mm]
Height: 10.5 [mm]
Deflection: 0 [°]
Measurement Condition
Measurement mode: Two Theta/Theta
Mode: PSD high speed scanning
Time/step: 0.280 [s]
Start: 20.0000 [°]
Stop: 120.0046 [°]
Step width: 0.007175469952

The X-ray diffraction patterns obtained by the measurements (in the range of diffraction angle 2θ=20 to 1200) were analyzed using an analysis software (software name: Topas Version 5).

As for the analysis, Fundamental Parameter was employed, and the a-axis length was refined in a state where the c-axis length of the crystallite size (Lorentzian method) was also set as a variable, according to the Pawley method.

Peaks of the X-ray diffraction patterns used in the analysis are as follows.

A peak indexed by a Miller index of (010) present around 20.5°
peak indexed by a Miller index of (001) present around 21.9°
A peak indexed by a Miller index of (011) present around 30.1°
A peak indexed by a Miller index of (110) present around 35.8°

A peak indexed by a Miller index of (020) present around 41.6°
A peak indexed by a Miller index of (111) present around 42.4°
A peak indexed by a Miller index of (002) present around 44.6°
A peak indexed by a Miller index of (021) present around 47.5°
A peak indexed by a Miller index of (012) present around 49.5°
A peak indexed by a Miller index of (210) present around 56.1°
A peak indexed by a Miller index of (112) present around 58.5°
A peak indexed by a Miller index of (211) present around 60.9°
A peak indexed by a Miller index of (022) present around 62.6°
A peak indexed by a Miller index of (030) present around 64.4°
A peak indexed by a Miller index of (031) present around 68.9°
A peak indexed by a Miller index of (003) present around 69.4°
A peak indexed by a Miller index of (013) present around 73.2°
A peak indexed by a Miller index of (212) present around 74.3°
A peak indexed by a Miller index of (220) present around 76.0°
A peak indexed by a Miller index of (310) present around 79.7°
A peak indexed by a Miller index of (221) present around 80.2°
A peak indexed by a Miller index of (113) present around 80.7°
A peak indexed by a Miller index of (032) present around 81.8°
A peak indexed by a Miller index of (311) present around 83.9°
A peak indexed by a Miller index of (023) present around 84.3°
A peak indexed by a Miller index of (040) present around 90.6°
A peak indexed by a Miller index of (222) present around 92.7°
A peak indexed by a Miller index of (041) present around 94.7°
A peak indexed by a Miller index of (213) present around 95.2°
A peak indexed by a Miller index of (312) present around 96.3°
A peak indexed by a Miller index of (004) present around 98.8°
A peak indexed by a Miller index of (320) present around 101.5°
A peak indexed by a Miller index of (014) present around 102.5°
A peak indexed by a Miller index of (033) present around 102.6°
A peak indexed by a Miller index of (321) present around 105.8°
A peak indexed by a Miller index of (042) present around 107.4°
A peak indexed by a Miller index of (410) present around 109.0°
A peak indexed by a Miller index of (114) present around 110.0°
A peak indexed by a Miller index of (411) present around 113.4°
A peak indexed by a Miller index of (024) present around 113.9°
A peak indexed by a Miller index of (223) present around 114.0°
A peak indexed by a Miller index of (313) present around 118.0°
A peak indexed by a Miller index of (322) present around 119.2°

PCT Measurement

The hydrogen storage alloy powder, which was obtained in each of Examples and Comparative Examples, having a particle size of −500 μm (particles capable of passing through a φ500 μm sieve mesh) was sieved out with a φ300 μm sieve mesh to obtain a hydrogen storage alloy (sample) of which the particle size was adjusted to 300 to 500 μm.

The resultant sample in an amount of 5 g was charged into a PCT apparatus sample holder, which was then connected to a PCT characteristics measuring apparatus (Suzuki Shokan Co., Ltd.).

The following operations were performed before the PCT measurement.

1) Alloy adhesive moisture removal treatment:
a series of operations in which the PCT apparatus sample holder was heated in a mantle heater (300° C.), and 1.75 MPa of hydrogen pressure was introduced into the PCT apparatus and allowed to stand for 10 minutes, followed by vacuuming, were performed twice.

2) Alloy activation treatment (treatment for exhibiting hydrogen storage characteristics of alloy):
3 MPa of hydrogen pressure was introduced into the PCT apparatus, and the PCT apparatus sample holder was taken out from the mantle heater and held for 10 minutes. Subsequently, the PCT apparatus sample holder was heated in the mantle heater (300° C.), followed by vacuuming for 10 minutes. The above series of operations were performed twice.

The PCT apparatus sample holder was taken out from the mantle heater and moved into a thermostatic bath set to 45° C., followed by vacuuming for 30 minutes. Thereafter, hydrogen was stored such that the end pressure was 2.9 MPa. The above series of operations were performed 6 times, followed by vacuuming for 3 hours and 30 minutes. Subsequently, the PCT measurement was performed such that the end pressure was 1.7 MPa. Equilibrium hydrogen pressure at H/M of 0.5 was determined as P0.5 (MPa) from the obtained PCT curve at 45° C. The results were shown in the item "P0.5@45° C." of Table 2.

TABLE 1

| | Component (wt %) | | | | | | | |
|---|---|---|---|---|---|---|---|---|
| | La | Ce | Nd | Pr | Ni | Co | Mn | Al |
| Comparative Example 1 | 26.97 | 4.87 | 0.00 | 0.00 | 59.01 | 1.96 | 5.46 | 1.73 |
| Comparative Example 2 | 27.15 | 4.75 | 0.00 | 0.00 | 60.02 | 0.90 | 5.46 | 1.72 |
| Comparative Example 3 | 26.98 | 4.90 | 0.00 | 0.00 | 60.90 | 0.00 | 5.49 | 1.73 |
| Example 1 | 32.38 | 0.00 | 0.00 | 0.00 | 60.76 | 0.00 | 4.95 | 1.91 |
| Example 2 | 32.50 | 0.00 | 0.00 | 0.00 | 60.69 | 0.00 | 4.91 | 1.90 |
| Comparative Example 4 | 11.49 | 15.66 | 4.91 | 1.47 | 48.78 | 10.41 | 5.35 | 1.93 |

TABLE 1-continued

| | Component (wt %) | | | | | | | |
|---|---|---|---|---|---|---|---|---|
| | La | Ce | Nd | Pr | Ni | Co | Mn | Al |
| Comparative Example 5 | 20.24 | 8.48 | 2.62 | 0.99 | 55.67 | 5.33 | 4.68 | 1.99 |
| Comparative Example 6 | 20.12 | 8.37 | 2.56 | 0.89 | 56.01 | 3.95 | 6.30 | 1.80 |
| Comparative Example 7 | 24.79 | 4.84 | 1.48 | 0.53 | 58.55 | 2.64 | 5.05 | 2.12 |
| Example 3 | 32.81 | 0.00 | 0.00 | 0.00 | 60.47 | 0.00 | 4.78 | 1.90 |
| Example 4 | 33.02 | 0.00 | 0.00 | 0.00 | 60.25 | 0.00 | 4.80 | 1.93 |
| Example 5 | 31.74 | 0.02 | 0.00 | 0.00 | 61.35 | 0.01 | 4.81 | 1.69 |
| Example 6 | 33.54 | 0.00 | 0.00 | 0.01 | 59.48 | 0.00 | 5.21 | 1.74 |
| Example 7 | 33.50 | 0.00 | 0.00 | 0.01 | 59.70 | 0.00 | 4.76 | 2.00 |
| Example 8 | 33.49 | 0.00 | 0.00 | 0.00 | 60.10 | 0.00 | 4.00 | 2.38 |
| Example 9 | 33.51 | 0.00 | 0.00 | 0.00 | 60.30 | 0.00 | 3.60 | 2.56 |
| Example 10 | 30.20 | 2.96 | 0.00 | 0.01 | 59.90 | 0.00 | 4.97 | 1.95 |

TABLE 2

| | Component (mol) | | | | | | | | B/A | Mn/Al | La/(Mn + Al) | a-axis length | P0.5@ 45° C. | Two-Step Pulverization-Treated Average Particle Diameter (μm) |
|---|---|---|---|---|---|---|---|---|---|---|---|---|---|---|
| | La | Ce | Nd | Pr | Ni | Co | Mn | Al | | | | | | |
| Comparative Example 1 | 0.85 | 0.15 | 0.00 | 0.00 | 4.39 | 0.15 | 0.43 | 0.28 | 5.25 | 1.55 | 1.19 | 5.022 | 0.048 | 11.50 |
| Comparative Example 2 | 0.85 | 0.15 | 0.00 | 0.00 | 4.46 | 0.07 | 0.43 | 0.28 | 5.24 | 1.56 | 1.20 | 5.022 | 0.050 | 10.74 |
| Comparative Example 3 | 0.85 | 0.15 | 0.00 | 0.00 | 4.53 | 0.00 | 0.44 | 0.28 | 5.24 | 1.56 | 1.18 | 5.021 | 0.053 | 7.90 |
| Example 1 | 1.00 | 0.00 | 0.00 | 0.00 | 4.44 | 0.00 | 0.39 | 0.30 | 5.130 | 1.27 | 1.45 | 5.048 | 0.020 | 5.13 |
| Example 2 | 1.00 | 0.00 | 0.00 | 0.00 | 4.42 | 0.00 | 0.38 | 0.30 | 5.100 | 1.27 | 1.46 | 5.047 | 0.022 | 5.54 |
| Comparative Example 4 | 0.35 | 0.47 | 0.14 | 0.04 | 3.48 | 0.74 | 0.41 | 0.30 | 4.93 | 1.36 | 0.49 | — | — | 8.35 |
| Comparative Example 5 | 0.63 | 0.26 | 0.08 | 0.03 | 4.10 | 0.39 | 0.37 | 0.32 | 5.18 | 1.15 | 0.92 | — | 0.070 | 8.39 |
| Comparative Example 6 | 0.63 | 0.26 | 0.08 | 0.03 | 4.17 | 0.29 | 0.50 | 0.29 | 5.26 | 1.72 | 0.80 | — | 0.051 | 8.38 |
| Comparative Example 7 | 0.79 | 0.15 | 0.05 | 0.02 | 4.39 | 0.20 | 0.41 | 0.35 | 5.34 | 1.17 | 1.05 | 5.020 | 0.050 | 8.58 |
| Example 3 | 1.00 | 0.00 | 0.00 | 0.00 | 4.36 | 0.00 | 0.37 | 0.30 | 5.03 | 1.23 | 1.50 | 5.055 | 0.016 | 5.65 |
| Example 4 | 1.00 | 0.00 | 0.00 | 0.00 | 4.32 | 0.00 | 0.37 | 0.30 | 4.99 | 1.22 | 1.50 | 5.058 | 0.014 | 5.15 |
| Example 5 | 1.00 | 0.00 | 0.00 | 0.00 | 4.57 | 0.00 | 0.38 | 0.27 | 5.23 | 1.40 | 1.52 | 5.043 | 0.031 | 5.80 |
| Example 6 | 1.00 | 0.00 | 0.00 | 0.00 | 4.20 | 0.00 | 0.39 | 0.27 | 4.86 | 1.48 | 1.52 | 5.056 | 0.016 | 5.71 |
| Example 7 | 1.00 | 0.00 | 0.00 | 0.00 | 4.22 | 0.00 | 0.36 | 0.31 | 4.89 | 1.17 | 1.50 | 5.054 | 0.017 | 5.12 |
| Example 8 | 1.00 | 0.00 | 0.00 | 0.00 | 4.25 | 0.00 | 0.30 | 0.37 | 4.92 | 0.83 | 1.50 | 5.053 | 0.016 | 6.03 |
| Example 9 | 1.00 | 0.00 | 0.00 | 0.00 | 4.26 | 0.00 | 0.27 | 0.39 | 4.93 | 0.69 | 1.51 | 5.053 | 0.016 | 6.02 |
| Example 10 | 0.90 | 0.10 | 0.00 | 0.00 | 4.28 | 0.00 | 0.38 | 0.30 | 4.96 | 1.25 | 1.32 | 5.042 | 0.022 | 5.31 |

Consideration

From the results of the above Examples, tests that have been performed by the present inventors, and the like, it could be confirmed that, in the $AB_5$-type hydrogen storage alloy, when the A site was constituted from a rare earth element containing La; and the B site did not contain Co and contained at least Ni, Al, and Mn, with the molar ratio Mn/Al of 0.60 or more and less than 1.56, and the molar ratio La/(Mn+Al) of more than 0.92, and when the two-step pulverization treatment in which the mechanical pulverization was performed after pulverizing the hydrogen storage alloy and absorbing/desorbing hydrogen was performed, the present hydrogen storage alloy could be further effectively micronized. Thus, when the present hydrogen storage alloy is used as a negative electrode active material for a battery, the output of the battery can be effectively enhanced.

The invention claimed is:

1. A hydrogen storage alloy comprising:
   a parent phase having an $AB_5$-type crystal structure,
   wherein the A site is constituted from a rare earth element containing La,
   wherein the B site does not contain Co and contains at least Ni, Al, and Mn, with the molar ratio (Mn/Al) of the content of Mn to the content of Al being 0.60 or more and less than 1.56, and the molar ratio (La/(Mn+Al)) of the content of La to the total content of the content of Al and the content of Mn being more than 0.92, and
   wherein, in a pressure-composition isothermal chart (PCT curve) at 45° C. an equilibrium hydrogen pressure at a hydrogen storage capacity (H/M) of 0.5 is 0.014 MPa or more and 0.035 MPa or less.

2. The hydrogen storage alloy according to claim 1, wherein the molar ratio (Mn/Al) of the content of Mn to the content of Al in the B site is 1.15 or more and less than 1.56.

3. The hydrogen storage alloy according to claim 1,
   wherein the alloy is represented by a general formula: $MmNi_aMn_bAl_c$ where Mm represents a rare earth element containing La, a is 4.2 or more and 4.6 or less, b is 0.1 or more and 0.6 or less, and c is 0.1 or more and 0.6 or less, and
   wherein a ratio ABx of the total number of moles of elements constituting the B site to the total number of moles of elements constituting the A site satisfies $4.85 \leq ABx \leq 5.40$.

4. The hydrogen storage alloy according to claim 1,
   wherein the alloy is represented by a general formula: $MmNi_aMn_bAl_c$ wherein Mm represents a rare earth element containing La, a is 4.2 or more and 4.6 or less, b is 0.1 or more and 0.6 or less, and c is 0.1 or more and 0.6 or less, and
   wherein a ratio ABx of the total number of moles of elements constituting the B site to the total number of moles of elements constituting the A site satisfies $5.00 \leq ABx \leq 5.40$.

5. The hydrogen storage alloy according to claim 1, wherein an a-axis length obtained by powder X-ray diffraction measurement is 5.03 Å or more and 5.07 Å or less.

6. A negative electrode active material for a nickel-hydrogen battery comprising the hydrogen storage alloy according to claim 1.

7. A nickel-hydrogen battery using the negative electrode active material according to claim 6.

8. A nickel-hydrogen battery to be mounted on an electric vehicle or a hybrid electric vehicle, using the negative electrode active material according to claim 6.

9. The hydrogen storage alloy according to claim 2,
wherein the alloy can be represented by a general formula: $MmNi_aMn_bAl_c$ wherein Mm represents a rare earth element containing La, and a is 4.2 or more and 4.6 or less, b is 0.1 or more and 0.6 or less, and c is 0.1 or more and 0.6 or less, and
wherein a ratio ABx of the total number of moles of elements constituting the B site to the total number of moles of elements constituting the A site satisfies $4.85 \leq ABx \leq 5.40$.

10. The hydrogen storage alloy according to claim 2,
wherein the alloy is represented by a general formula: $MmNi_aMn_bAl_c$ wherein Mm represents a rare earth element containing La, and a is 4.2 or more and 4.6 less, b is 0.1 or more and 0.6 or less, and c is 0.1 or more and 0.6 or less, and
wherein a ratio ABx of the total number of moles of elements constituting the B site to the total number of moles of elements constituting the A site satisfies $5.00 \leq ABx \leq 5.40$.

\* \* \* \* \*